US012607467B2

(12) United States Patent
Sergeev et al.

(10) Patent No.: US 12,607,467 B2
(45) Date of Patent: Apr. 21, 2026

(54) SHARED TILE MAP WITH LIVE UPDATES

(71) Applicant: GM Cruise Holdings LLC, San Francisco, CA (US)

(72) Inventors: Roman Sergeev, San Francisco, CA (US); Andrea Allais, San Francisco, CA (US); Gautier Minster, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 545 days.

(21) Appl. No.: 17/901,336

(22) Filed: Sep. 1, 2022

(65) Prior Publication Data

US 2023/0032009 A1     Feb. 2, 2023

Related U.S. Application Data

(63) Continuation of application No. 16/730,639, filed on Dec. 30, 2019, now Pat. No. 11,624,617.

(51) Int. Cl.
| | |
|---|---|
| *G01C 21/32* | (2006.01) |
| *B60W 60/00* | (2020.01) |
| *G01C 21/34* | (2006.01) |

(52) U.S. Cl.
CPC ........... *G01C 21/32* (2013.01); *B60W 60/001* (2020.02); *G01C 21/3407* (2013.01); *B60W 2556/50* (2020.02)

(58) Field of Classification Search
CPC .. G01C 21/32; G01C 21/3407; B60W 60/001
See application file for complete search history.

(56) References Cited

U.S. PATENT DOCUMENTS

| | | | |
|---|---|---|---|
| 8,392,482 B1 | 3/2013 | McAlister et al. | |
| 2007/0080830 A1* | 4/2007 | Sacks ................. | G01C 21/3881 |
| | | | 340/995.1 |
| 2014/0340421 A1* | 11/2014 | Otero ................... | G01C 21/367 |
| | | | 345/619 |
| 2016/0275131 A1* | 9/2016 | Lublinsky .............. | G06F 16/29 |
| 2017/0169544 A1 | 6/2017 | Boulkenafed et al. | |
| 2018/0183873 A1 | 6/2018 | Wang et al. | |
| 2018/0189323 A1* | 7/2018 | Wheeler ............. | G06F 12/0811 |
| 2019/0294173 A1 | 9/2019 | Szubbocsev | |
| 2020/0104289 A1 | 4/2020 | Premawardena | |
| 2021/0049901 A1* | 2/2021 | Young ..................... | H04W 4/46 |
| 2021/0123752 A1 | 4/2021 | Rolf et al. | |

* cited by examiner

Primary Examiner — Erin M Piateski
Assistant Examiner — Gabriel Joseph Rene Lambert
(74) Attorney, Agent, or Firm — Honigman LLP; Matthew H. Szalach; Jonathan P. O'Brien

(57) ABSTRACT

Systems, methods, and devices are disclosed for synchronizing a map within shared memory for a navigating autonomous vehicle. A map, defined by a geographical area around an autonomous vehicle navigating a route, can be received and stored in shared memory. The shared memory can be a specific physical block of RAM. Concurrent access to the map within the shared memory can be granted to downstream nodes on the autonomous vehicle as the autonomous vehicle navigates the route. This shares the map among many nodes while, at the same time, allowing updates to the map without blocking those nodes at any time.

20 Claims, 8 Drawing Sheets

200

300

Receive a map defined by a geographical area around an autonomous vehicle navigating a route.
302

Store the map in shared memory, wherein the shared memory is a specific physical block of RAM.
304

Grant concurrent access to the map within the shared memory to downstream nodes on the autonomous vehicle as the autonomous vehicle navigates the route.
306

310

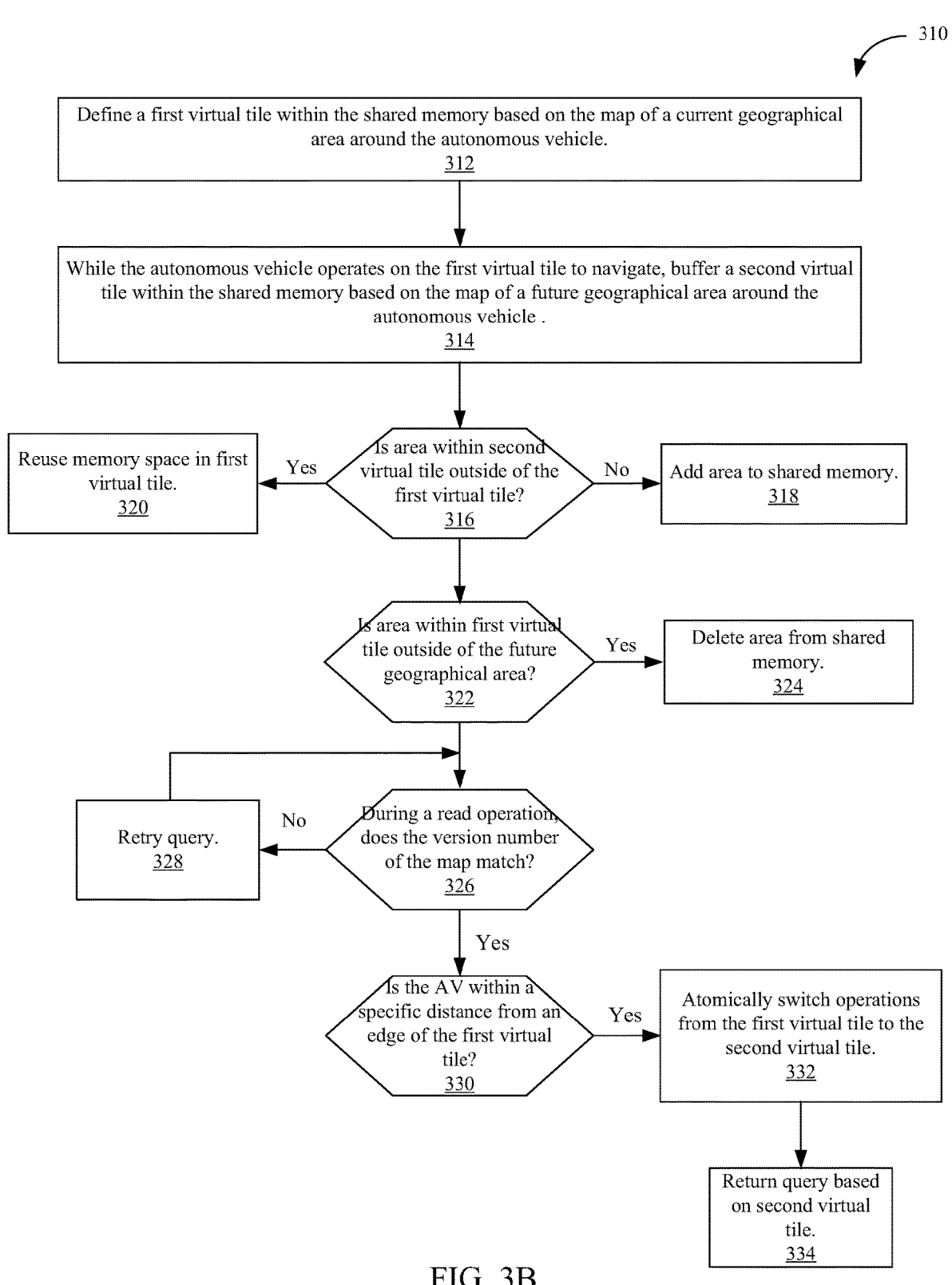

Define a first virtual tile within the shared memory based on the map of a current geographical area around the autonomous vehicle.
312

While the autonomous vehicle operates on the first virtual tile to navigate, buffer a second virtual tile within the shared memory based on the map of a future geographical area around the autonomous vehicle .
314

Reuse memory space in first virtual tile.
320

Yes

Is area within second virtual tile outside of the first virtual tile?
316

No

Add area to shared memory.
318

Is area within first virtual tile outside of the future geographical area?
322

Yes

Delete area from shared memory.
324

Retry query.
328

No

During a read operation, does the version number of the map match?
326

Yes

Is the AV within a specific distance from an edge of the first virtual tile?
330

Yes

Atomically switch operations from the first virtual tile to the second virtual tile.
332

Return query based on second virtual tile.
334

FIG. 3B mapBegin 530 {0,0}                                              502

| Tile 510 (-2,-2) | Tile 510 (-1,-2) | Tile 510 (0,-2) | Tile 510 (1,-2) | Buffer 520 |
| Tile 510 (-2,1) | Tile 510 (-1,-1) | Tile 510 (0,-1) | Tile 510 (1,-1) | Buffer 520 |
| Tile 510 (-2,0) | Tile 510 (-1,0) | Tile 510 (0,0) | Tile 510 (1,0) | Buffer 520 |
| Tile 510 (-2,1) | Tile 510 (-1,1) | Tile 510 (0,-1) | Tile 510 (1,1) | Buffer 520 |
| Buffer 520 | Buffer 520 | Buffer 520 | Buffer 520 | Buffer 520 |

FIG. 5A mapBegin 530                                              502

| Buffer 520 | Tile 510 (-1,-2) | Tile 510 (0,-2) | Tile 510 (1,-2) | Tile 510 (2,-2) |
| Buffer 520 | Tile 510 (-1,-1) | Tile 510 (0,-1) | Tile 510 (1,-1) | Tile 510 (2,1) |
| Buffer 520 | Tile 510 (-1,0) | Tile 510 (0,0) | Tile 510 (1,0) | Tile 510 (2,0) |
| Buffer 520 | Tile 510 (-1,1) | Tile 510 (0,-1) | Tile 510 (1,1) | Tile 510 (2,1) |
| Buffer 520 | Buffer 520 | Buffer 520 | Buffer 520 | Buffer 520 |

FIG. 5B mapBegin 530

502

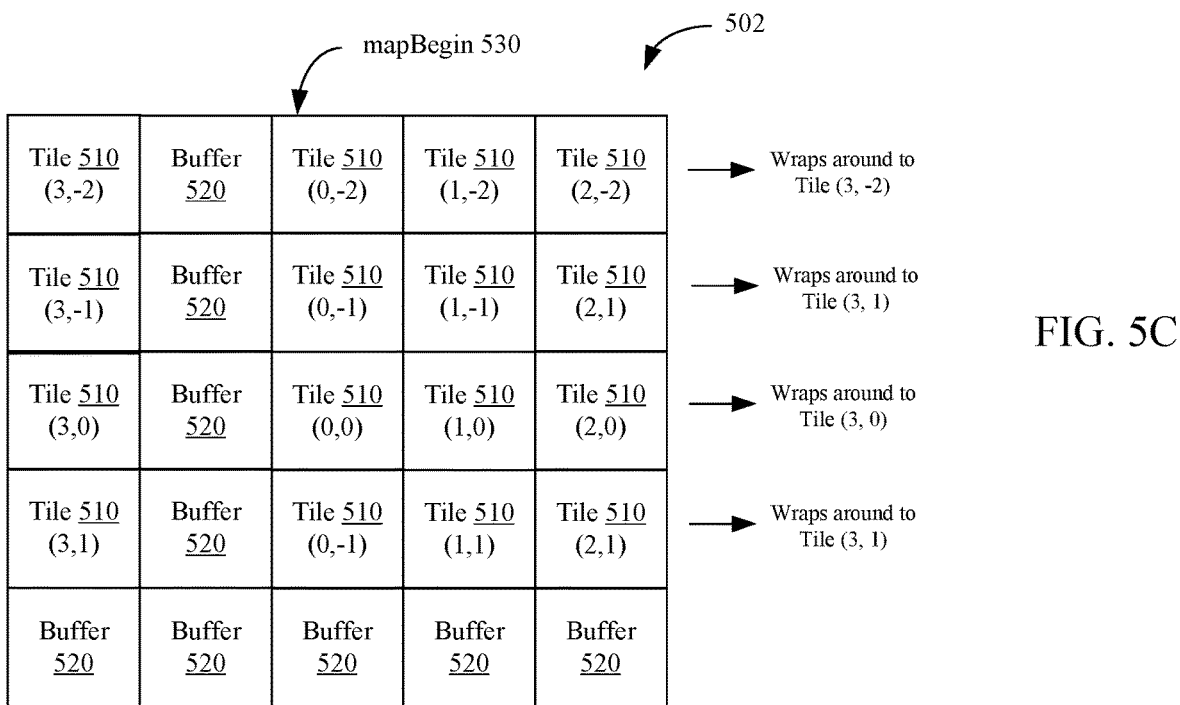

| | | | | |
|---|---|---|---|---|
| Tile 510 (3,-2) | Buffer 520 | Tile 510 (0,-2) | Tile 510 (1,-2) | Tile 510 (2,-2) |
| Tile 510 (3,-1) | Buffer 520 | Tile 510 (0,-1) | Tile 510 (1,-1) | Tile 510 (2,1) |
| Tile 510 (3,0) | Buffer 520 | Tile 510 (0,0) | Tile 510 (1,0) | Tile 510 (2,0) |
| Tile 510 (3,1) | Buffer 520 | Tile 510 (0,-1) | Tile 510 (1,1) | Tile 510 (2,1) |
| Buffer 520 | Buffer 520 | Buffer 520 | Buffer 520 | Buffer 520 |

Wraps around to Tile (3, -2)

Wraps around to Tile (3, 1)

Wraps around to Tile (3, 0)

Wraps around to Tile (3, 1)

| | | | | |
|---|---|---|---|---|
| Tile 510 (2,3) | Buffer 520 | Tile 510 (-1,3) | Tile 510 (0,3) | Tile 510 (1,3) |
| Tile 510 (2,4) | Buffer 520 | Tile 510 (-1,4) | Tile 510 (0,4) | Tile 510 (1,4) |
| Buffer 520 | Buffer 520 | Buffer 520 | Buffer 520 | Buffer 520 |
| Tile 510 (2,1) | Buffer 520 | Tile 510 (-1,1) | Tile 510 (0,1) | Tile 510 (1,1) |
| Tile 510 (2,2) | Buffer 520 | Tile 510 (-1,2) | Tile 510 (0,2) | Tile 510 (1,2) |

Wraps around to Tile (2,3)

Wraps around to Tile (2, 4)

mapBegin 530

Wraps around to Tile (2, 1)

Wraps around to Tile (3, -2)

Wraps around to Tile (2, 3)

Wraps around to Tile (-1, 3)

Wraps around to Tile (0, 3)

Wraps around to Tile (1, 3)

SHARED TILE MAP WITH LIVE UPDATES

CROSS-REFERENCE TO RELATED APPLICATIONS

This application is a continuation of and claims the benefit of U.S. application Ser. No. 16/730,639, filed on Dec. 30, 2019, entitled SHARED TILE MAP WITH LIVE UPDATES, which is expressly incorporated by reference herein in its entirety

TECHNICAL FIELD

The present technology pertains to maps within a shared memory, and more specifically pertains to synchronizing a map within shared memory for a navigating autonomous vehicle.

BACKGROUND

An autonomous vehicle (AV) is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Autonomous vehicles can use maps in order to orient themselves and navigate routes. One such map can be a tiled map, which is a 2D map where each pixel is mapped to a certain geolocation and stores a certain value of that area. While the format of these tiles could be anything from portable network graphics (PNG) to uncompressed binary large objects (BLOB), the typical internal representation of these tiles are flattened 2D arrays. This makes this type of map extremely useful for requests for values at (x,y) location on the map, which can be used for a preliminary filtration of input data from sensors or for quick fact-checks (e.g., is location (x,y) a sidewalk or drivable area?).

However, this usefulness comes at a cost. A disadvantage of tiled maps is their excessive usage of RAM and Disk I/O latency when loading tiles. Tiled maps work reasonably well as long as the number of nodes that need to read from the map is limited. If multiple services (e.g., multiple nodes) need to access to the map during navigation, for example, currently all the tiles are loaded within a process memory space for each individual node. This means the tiled map is duplicated for each different service, and as a consequence a large amount of CPU/RAM is wasted in order to load and store duplicated tiled map data. Another limitation is that tiles are stored as individual tiles, making inter-tile queries inefficient. What is needed are new systems and methods for addressing these shortcomings of tiled maps.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3B shows an example method for generating virtual tiles and updating methods within the shared memory in accordance with some embodiments;

FIGS. 5A-5D shows an example rolling array or sliding window technique that can be utilized for a memory-wise and cpu-wise solution or a navigating autonomous vehicle in accordance with some aspects of the present technology.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for reducing excessive usage of RAM and Disk I/O latency when loading tiles. Typically, all the tiles within a tiled map are loaded within a process memory space for each individual node that needs to access the tiled map during navigation. Tiled maps work reasonably well in this way as long as the number of nodes that need to read from the map is limited. But if multiple services (e.g., multiple nodes) need to access to the map, especially at the same time, then the duplication of the tiled map for each service wastes a large amount of CPU/RAM in order to load and store duplicated tiled map data. Another limitation is that tiles are stored as individual tiles within the tiled map, making inter-tile queries inefficient. New systems and methods for addressing these shortcomings of tiled maps are needed.

The solution involves systems, methods, and devices for synchronizing a map within shared memory. For example, maps, defined by a geographical area around an autonomous vehicle navigating a route, can be received and stored in shared memory, where the shared memory can be a specific physical block of RAM. Concurrent access to the map within the shared memory can be granted to downstream nodes on the autonomous vehicle as the autonomous vehicle navigates the route. This shares the map among many nodes while, at the same time, allowing updates to the map without blocking those nodes from reading the map at any time.

Figure 1:
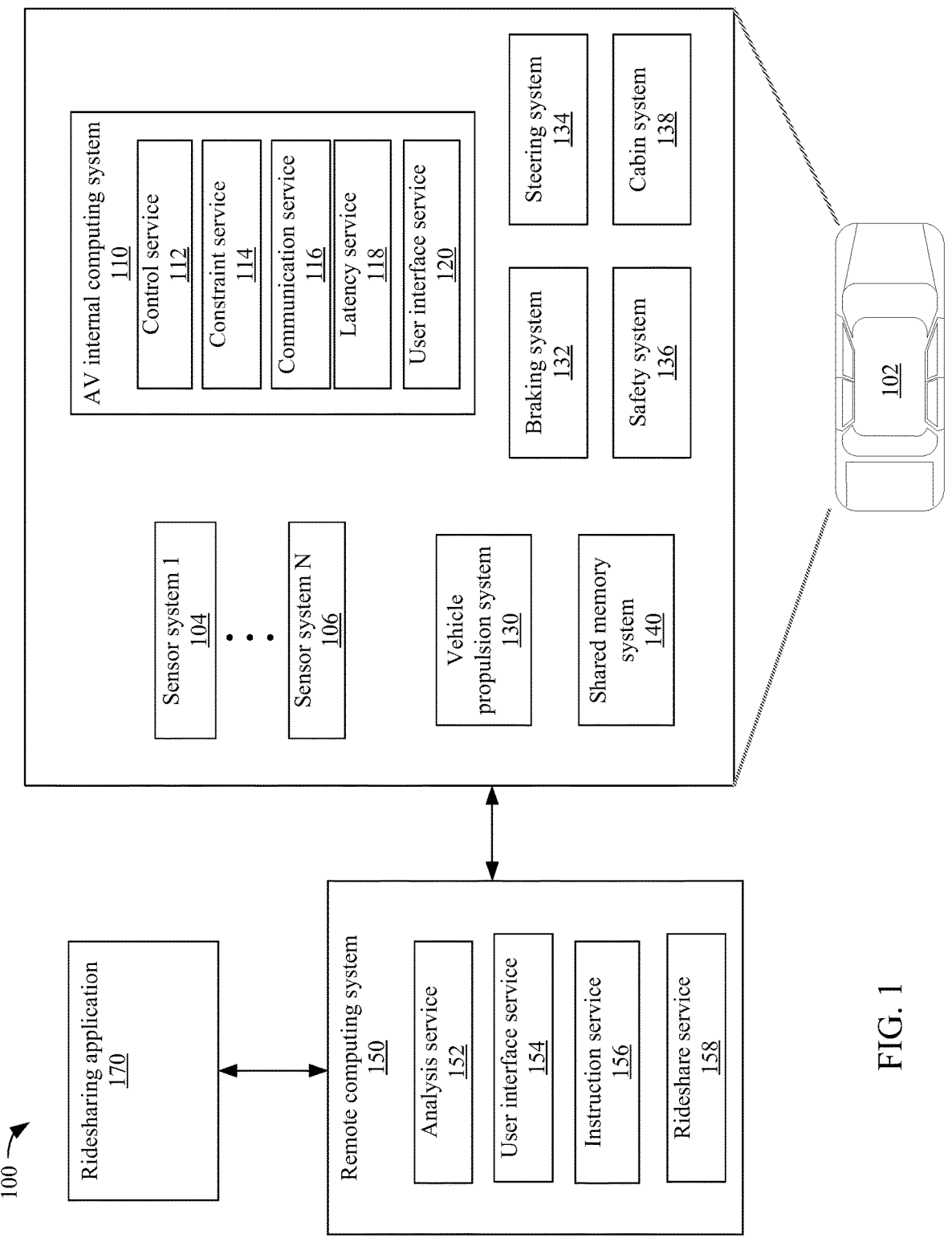
FIG. 1 illustrates an example schematic diagram of an autonomous vehicle and network environment, in accordance with some embodiments.

For example, FIG. 1 illustrates environment 100 that includes an autonomous vehicle 102 with shared memory system 140 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 further includes a shared memory service 140 that can include a shared memory that stores one or more maps that the autonomous vehicle 102 uses to orient itself and/or navigate. Shared memory system can include, for example, a non-volatile memory device and can be a hard disk or other types of computer readable media which can store data that are accessible by multiple services and/or systems on the autonomous vehicle 102, such as random access memories (RAMs), read-only memory (ROM), magnetic cassettes, flash memory cards, solid state memory devices, digital versatile disks, cartridges, and/or some combination of these devices. For example, in some embodiments, shared memory service 140 can share the same physical block of RAM among sensor systems 104-106.

The autonomous vehicle 102 additionally comprises an autonomous vehicle (AV) AV internal computing system 110 that is in communication with the sensor systems 104-106 and the systems 130, 132, 134, 136, and 138. The AV internal computing system 110 includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The AV internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the AV internal computing system 110 to effectuate operation of the autonomous vehicle 102. In some embodiments, control service 112 may carry out operations in concert with one or more other systems of autonomous vehicle 102.

The AV internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The AV internal computing system 110 can also include a communication service 116. The communication service 116 can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the AV internal computing system 110 are configured to send and receive communications to remote computing system 150 for such reasons as reporting data for training and evaluating machine learning algorithms, requesting assistance from remote computing system 150 or a human operator via remote computing system 150, software service updates, ridesharing pickup and drop off instructions, etc.

The AV internal computing system 110 can also include a latency service 118. The latency service 118 can utilize timestamps on communications to and from the remote computing system 150 to determine if a communication has been received from the remote computing system 150 in time to be useful. For example, when a service of the AV internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The AV internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle 102 wherein a passenger might provide instructions to the autonomous vehicle 102 to go around an obstacle, change routes, honk the horn, etc.

Figure 2:
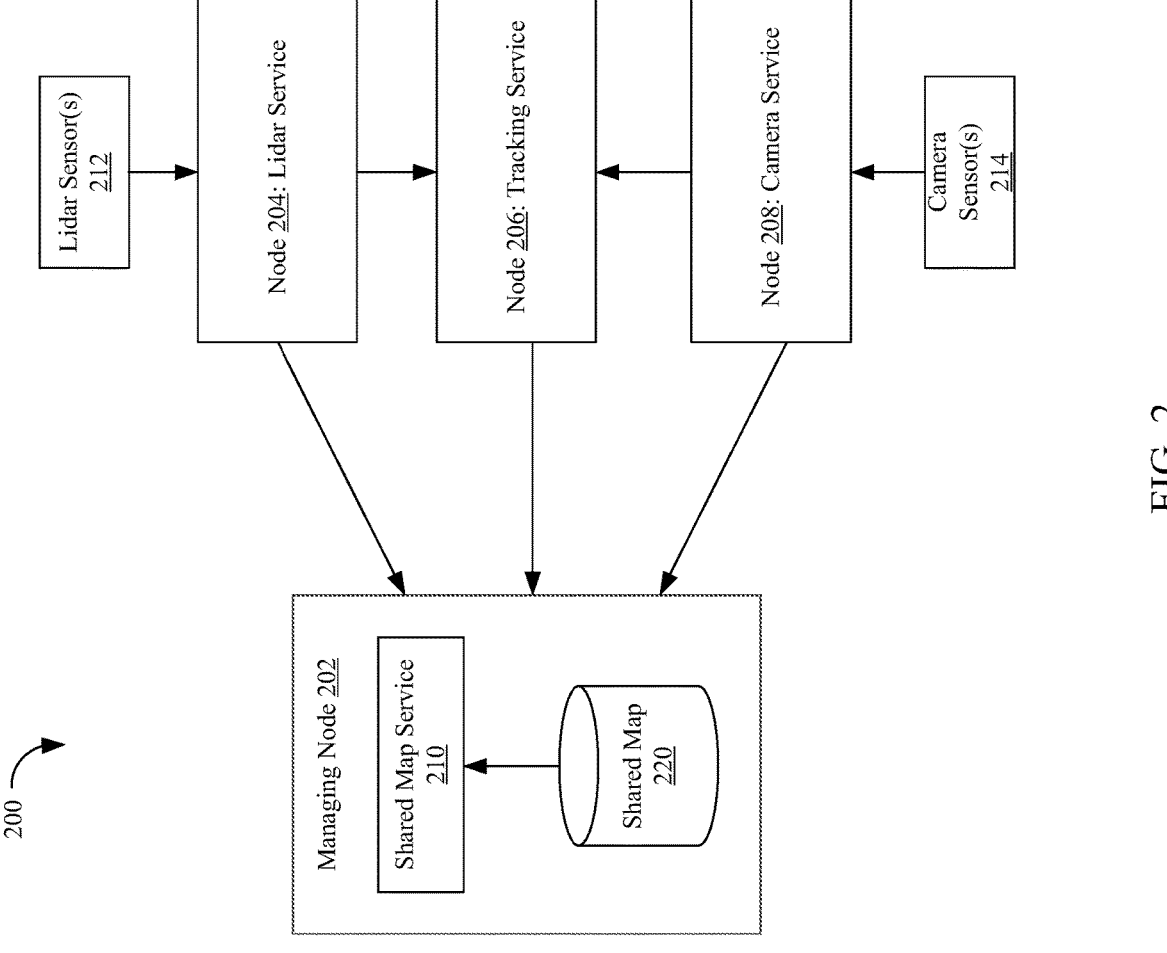
FIG. 2 shows an example system for multiple nodes accessing shared memory for a navigating autonomous vehicle in accordance with some embodiments.

FIG. 2 shows an example autonomous vehicle system for multiple nodes accessing shared memory for a navigating autonomous vehicle in accordance with some embodiments. In some embodiments, the autonomous vehicle can navigate about roadways without a human driver based upon sensor signals output by sensor systems and maps of the route and/or surrounding area. The maps, for example, can be tiled maps, or 2-dimensional maps where each pixel is mapped to a certain geolocation and stores a certain value of that area. For example, each pixel can correspond to an (x,y) location and a value/data at that location, such as a value corresponding to drivable vs. undrivable areas, objects (traffic signs, traffic lights, etc.), etc.

In some embodiments, the autonomous vehicle may have multiple services that rely on the tiled map, sometimes simultaneously, such as an autonomous vehicle using a micro-service architecture with independent processes that communicate with each other while the autonomous vehicle navigates a route. System 200, for example, shows managing node 202 in communication with various downstream nodes—node 204, node 206, and node 208. The various downstream nodes can be independent processes associated with sensors and/or a navigation service that operate on a shared memory managed by shared map service 210. Shared map service 210, for example, can store shared map 220 data that can be simultaneously and/or concurrently accessed by the downstream nodes. For example, shared map 220 can be a specific physical block of RAM that stores the map, which is then accessible by one or more of node 204, node 206, and/or node 208 at the same time.

Shared map 220, for example, can be a 2-D tile map that includes pixels mapped to a certain geolocation. Each pixel can store data, such as a certain value, at that geolocation. The data can be data previously captured by lidar sensor(s) 212, camera sensor(s) 214, or any other sensors or systems that collect data for map generation on the autonomous vehicle. As the autonomous vehicle navigates, downstream nodes can concurrently access the shared map 220 by querying for pixel values within the tile map.

In system 200, for example, the downstream nodes can be independent processes related to sensors and navigation services that operate on the specific physical block of RAM in shared memory (e.g., shared map 220). For example, node 204 is a lidar service that measures distance to a target by illuminating the target with laser light and measuring the reflected light with lidar sensor(s) 212. Differences in laser return times and wavelengths can then be used to make digital 3-D representations of the target. Node 208 can be a camera service that captures visual images with camera sensor(s) 214. Any number of different sensors may be used that can gather information about the navigating autonomous vehicle's route, surrounding environment, and/or proximate objects (cars, pedestrians, traffic cones, etc.) in other embodiments.

In some embodiments, the downstream nodes can interoperate with each other, such as by providing services that take the output from other downstream nodes as its input. In system 200, for example, node 206 is a tracking service, such as an autonomous vehicle stack, that operates on the data provided by lidar sensor(s) 212 (node 204) and/or camera sensor(s) 214 (node 208). Because node 206 supports the tracking service that relies on data captured by other nodes, the map each node operates on should be the same across all nodes simultaneously. Shared map service 210 solves any potential undefined or inconsistent data between different map versions with shared map 220, since the downstream nodes can operate on the specific physical block of RAM and concurrently communicate with the autonomous vehicle stack (e.g., tracking service on node 206).

As a result, system 200's shared map 220 does not suffer from excessive usage of RAM and Disk I/O latency to load map tiles, since it is no longer required to load individual maps for each downstream node. In addition, system 200 results in more accurate data collection, analysis, and application since map versioning does not need to be copied and synchronized across all the nodes that access the map in order to operate.

Figure 3A:
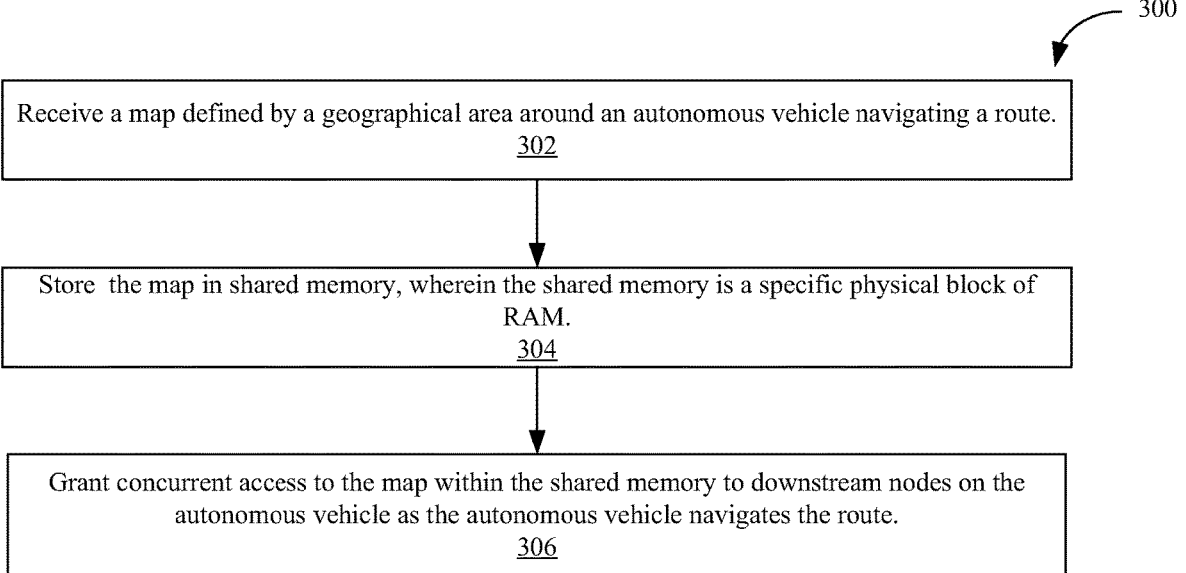
FIG. 3A shows an example method for multiple nodes accessing shared memory for a navigating autonomous vehicle in accordance with some embodiments.

FIGS. 3A and 3B show example methods for multiple nodes accessing the shared memory, in accordance with some embodiments. In FIG. 3A, method 300 starts by receiving (302) a map defined by a geographical area around an autonomous vehicle navigating a route, which will become a map shared by multiple nodes at the same time. In some embodiments, the entire map may be too large for efficient map processing in a micro-service architecture, which relies on multiple nodes to handle different services (e.g., lidar service, camera service, etc.), and so a subset of the entire map can be received by and stored (304) in shared memory. In some embodiments, in the autonomous vehicle, the map is stored on the hard drive. The hard drive could be big enough to store the entire map (like a city wide map [e.g., San Francisco map], or a state-wide map [e.g., California map]). In order to use the map, a node needs to load data from HD to RAM. The amount of RAM available in computers is much less than HD, hence the entire map stored on HD may not be able to be loaded to RAM at once. Instead, segments of the entire map (set of tiles, virtual tile) can be loaded. Shared memory can thus be used for the instances where it is too expensive for each node to load the same tiles. The shared memory can be, for example, a specific physical block of RAM.

Downstream nodes on the autonomous vehicle can be granted (306) concurrent access to the map within the shared memory as the autonomous vehicle navigates the route. In some circumstances, the map within shared memory will need to be updated in order to reflect any changes due to car movement. Since the shared map stores and exposes for users only a small segment around the current autonomous vehicle location of an entire map, this means data in shared memory needs to be updated following the autonomous vehicle's change of location. Since any downstream node (and any number of downstream nodes) can access the map within the shared memory at a given time, a synchronization method is needed that allows the downstream nodes continuous access, but ensures that the downstream nodes are reading from the same map version.

FIG. 3B illustrates one such example method for and updating methods within the shared memory in accordance with some embodiments. Sharing a map through shared memory (e.g., for example, a shared map cache) introduces challenges over systems where maps are stored in each node's own cache. Method 310 optimizes the amount of working memory needed to use the same segment of the map between multiple nodes.

An autonomous vehicle software can work with two or more of virtual tiles during its navigation process. For example, method 310 uses both a current virtual tile and a buffer virtual tile so that as the current tile is used during navigation, the buffer virtual tile is prepared in advance to allow for seamless switching. Any number of virtual tiles may be used, depending on the amount of RAM space and Disk I/O latency that is allowable in autonomous vehicle navigation.

Specifically, a first virtual tile can be defined (312) within the shared memory based on the map of a current geographical area around the autonomous vehicle. The first virtual tile, such as virtual tile A 404 shown in the example visualization of virtual tile maps illustrated in FIG. 4, can be a set of tiles 410 in a given or defined region that can be treated as a regular tile, but which covers all the area that can be queried by the navigation service (e.g., the AV stack) at a given time.

In some embodiments, a virtual tile can be represented as a 2D array that can be stored within shared memory as a flattened representation of the 2D array. This can be an implementation that can provide access to map values for given (x,y) coordinates. Any well known method for storing 2D arrays can be used.

Since the autonomous vehicle 402 is navigating and changes position over time, in order to maintain the actuality of map data within a virtual tile, the virtual tile needs to move along with the autonomous vehicle's 402 position. As a result, while the autonomous vehicle 402 operates on the first virtual tile (e.g., virtual tile A 404) to navigate, at least a second virtual tile can be buffered (314) within the shared memory based on the map of another geographical area around the autonomous vehicle.

In an embodiment, this second virtual tile can be virtual tile B 406, which covers an area within autonomous vehicle's 402 direction of travel and/or planned route. This allows the system to keep virtual tile A 404 exposed to readers while preparing virtual tile B 406 for its subsequent position.

In some embodiments, rolling array or sliding window techniques can be utilized for a memory-wise and cpu-wise solution, such as that shown in FIGS. 5A-5C. In FIG. 5A, virtual tile 502 is comprised of multiple tiles 510 and buffer 520. In the example embodiment shown, virtual tile 502 includes 4×4 tiles 510 and a buffer of 1 tile 510 size. This can be the initial state of the shared Map. mapBegin 530 can point to the first (0, 0) element of the virtual tile 502, the upper left corner (e.g., tile (−2,−2) 510). In some embodiments, mapBegin 530 and the rest of the variables can be the meta information required to define the boundaries of virtual tile 502 and buffer 520 within the 2D rolling array.

In some embodiments, the sliding window can be rolled UP/DOWN/LEFT/RIGHT one operation at a time. FIG. 5B shows that in order to move virtual tile 502 to the right, the vertical buffer 520 line can be used to load 4 new tiles 510. Then the mapBegin 530 is updated to point to the new left upper corner of new virtual tile 502 (e.g., tile (−1,−2) 510).

In FIG. 5C, virtual tile 502 is moved to the right one more time (e.g., the operation is repeated). Vertical buffer line 520 is used to load 4 tiles 510 (which, in the real world, would be to the right side of the virtual tile 502) but in a 2D rolling array, tiles 510 are placed to the buffer line 520 no matter where it is. Then mapBegin 530 is updated (e.g., tile (0,−2) 510). Moreover, tile (2,−2) 510 can wrap around to tile (3,−2) 510; tile (2,−1) 510 can wrap around to tile (3,−1) 510; tile (2,0) 510 can wrap around to tile (3,0) 510; and tile (2,1) 510 can wrap around to tile (3,1) 510.

FIG. 5D shows virtual tile 502 after several move operations. mapBegin 530 is updated to tile (−1,1) 510. Tile (1,3) 510 can wrap around to tile (2,−3) 510; tile (1,4) 510 can wrap around to tile (2,4) 510; tile (1,1) 510 can wrap around to tile (2,1) 510; and tile (1,2) 510 can wrap around to tile (2,2) 510. Moreover, tile (2,2) 510 can wrap around to tile (2,3) 510; tile (−1,2) 510 can wrap around to tile (−1,3) 510; tile (0,2) 510 can wrap around to tile (0,3) 510; and tile (1,2) 510 can wrap around to tile (1,3) 510.

Since the shared memory has stored data for all the tiles within the first virtual tile, there is no need to load or update those values for any tiles within a subsequent virtual tile that overlaps with the first virtual tile. For example, if the second virtual tile is buffering before the autonomous vehicle 402 reaches it, then any given tile within the second virtual tile that is also located within the first virtual tile can be bypassed or skipped when uploaded to the shared memory.

This means that in some embodiments, the shared memory need only store data for tiles that are within the first virtual tile and the second virtual tile (e.g., only tiles within the current virtual tile and buffering virtual tile). If tiles within the second virtual tile are within an area within the future geographical area but outside the current geographical area of the first virtual tile (316), then those tiles are added (318) to the shared memory. If the tiles within the second virtual tile are within the current geographical area of the first virtual tile, then those tiles are bypassed from being uploaded to the shared memory and/or reused (320) since those tiles have already been stored on the shared memory.

Figure 4:
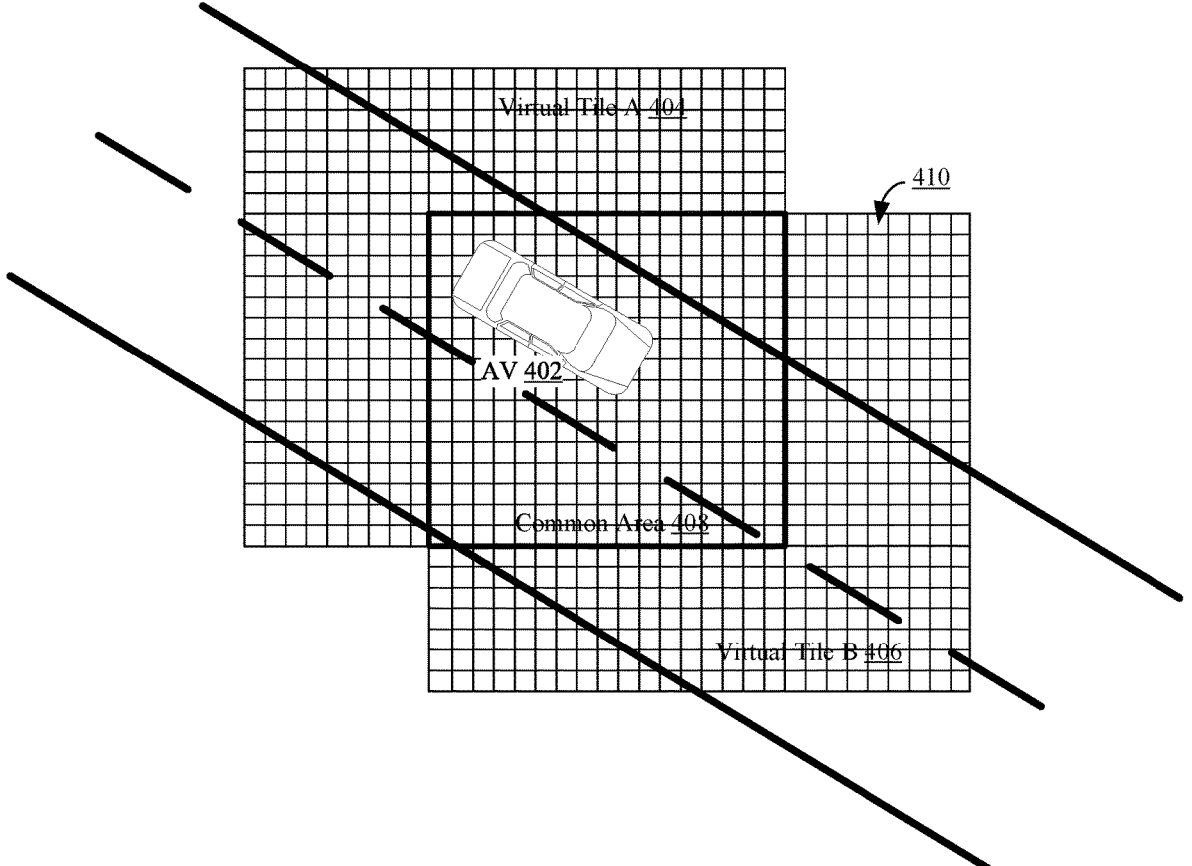
FIG. 4 shows an example visualization of virtual tile maps and update areas for a navigating autonomous vehicle in accordance with some aspects of the present technology.

For example, in FIG. 4, tiles within common area 408 are bypassed from uploads associated with virtual tile B 406 to the shared memory, since those tiles have already been stored in association with virtual tile A 404. This means that when virtual tile B 406 is uploaded during a buffer process, then only those tiles within virtual tile B 406 and outside common area 408 needs to be uploaded into the shared memory.

Conversely, any tiles within the second virtual tile that are outside the future geographical area (322) can be deleted (324) from shared memory when the system switches the current tile from virtual tile A 404 to virtual tile B 406, again bypassing common area 408 since those tiles can be reused.

Since any downstream node (and any number of downstream nodes) can access the map within the shared memory at a given time, a synchronization method is needed that allows the downstream nodes continuous access, but ensures that the downstream nodes are reading from the same virtual tile. In some embodiments, updates to the map within the shared memory can be performed without explicitly blocking the readers. In order to do so, a version number can be assigned to a specific virtual tile (e.g., version no. 001). When the next virtual tile is created, a next version number (e.g., version no. 002) can be assigned to the updated version of the map. The writer can update the map within the shared memory independently of whether the downstream nodes are reading the map. In other words, the writer can update the map even if one or more downstream nodes are currently reading the map. For example, this can be implemented by storing the data of two virtual tiles in shared memory, where one is currently used by readers and the other one is used for the next map update.

In order to avoid version confusion, the system can check whether the version of the map has changed while being read. For example, if a downstream node initiates a read operation on version no. 001 of the map, the system can determine if there is a match (326) between version numbers at the end of the read operation. If the version of the map remains as version no. 001, then the query is returned. However, if the version of the map changes due to an update in between the initiation and end of the read operation (e.g., the version of the map changes to version no. 002), then the query is retried (328) at a subsequent time until the version numbers match.

In some embodiments, the system can atomically switch operations from the first virtual tile to the second virtual tile when the autonomous vehicle reaches a specific distance from an edge of the first virtual tile. In other words, once the autonomous vehicle 402 reaches the margin of the current virtual tile (330), the buffer virtual tile can then become the current virtual tile and the next virtual tile can begin to buffer another virtual tile (defined by the next future geographical area within autonomous vehicle's 402 navigation). It does so by atomically switching (332) operations from the first virtual tile to the second virtual tile. Any queries are then returned (334) based on the second virtual tile instead of the first virtual tile.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
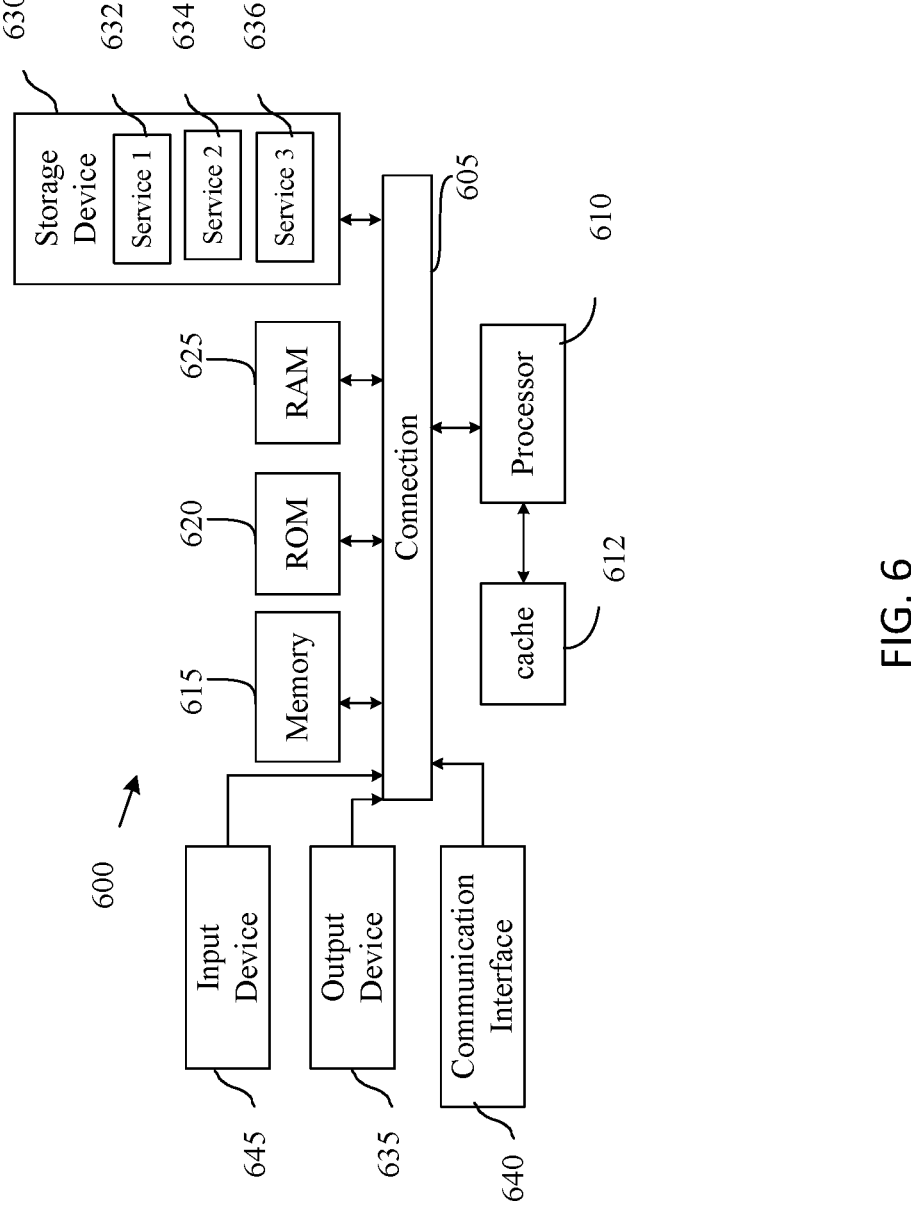
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

storing data representing a virtual map tile in a physical block of memory of an autonomous vehicle computing system, wherein the virtual map tile pertains to a geographical area around an autonomous vehicle that is represented by portions of at least a first map tile of a stored map, and wherein the virtual map tile has a version number having a first value; and as the autonomous vehicle moves;

identifying a second map tile of the stored map that represents the geographical area in a direction of movement of the autonomous vehicle;

updating the virtual map tile by reusing a first portion of the physical block of memory to store a second portion of the second map tile, wherein a third portion of the physical block of memory stores a fourth portion of the first map tile, and wherein the physical block of memory stores the second portion of the second map tile and the fourth portion of the first map tile in a rolling array that is accessible using wrap-around read operations; and updating the version number of the virtual map tile to a second value different from the first value, wherein the version number can be used to detect when a query on the virtual map tile occurred during updating of the virtual map tile.

2. The method of claim 1, wherein the rolling array comprises a two-dimensional (2D) array pertaining to the geographical area around the autonomous vehicle, and wherein the 2D array relates to map values represented by map coordinates.

3. The method of claim 1, further comprising:

identifying additional tiles that represent the geographical area in the direction of movement of the autonomous vehicle;

determining that data of at least one of the additional tiles matches the geographical area of another map tile currently stored in the physical block of memory; and bypassing storing the data of the at least one of the additional tiles.

4. The method of claim 3, further comprising:

automatically performing the storing of the data of the at least one of the additional tiles when the geographical area is outside of a specific distance of the geographical area of the first map tile.

5. The method of claim 1, further comprising:

identifying a third map tile after the autonomous vehicle has reached a margin distance from an edge of the first map tile, wherein the third map tile represents a further geographic area in a further direction of the movement of the autonomous vehicle.

6. The method of claim 1, further comprising:

identifying a future geographical area of the autonomous vehicle;

identifying additional tiles within the geographical area of the second map tile that are outside of a specific distance of the future geographical area; and removing the additional tiles from the physical block of memory.

7. The method of claim 1, further comprising:

identifying additional map tiles of the stored map that represent a geographical area not in the direction of the movement of the autonomous vehicle; and removing the additional map tiles from the physical block of memory.

8. A system comprising:

a processor; and a memory in communication with the processor and storing instructions that, when executed by the processor, cause the processor to:

store data representing a virtual map tile in a physical block of memory of an autonomous vehicle computing system, wherein the virtual map tile pertains to a geographical area around an autonomous vehicle that is represented by portions of at least a first map tile of a stored map, and wherein the virtual map tile has a version number having a first value; and as the autonomous vehicle moves:

identify a second map tile of the stored map that represents the geographical area in a direction of movement of the autonomous vehicle;

update the virtual map tile by reusing a first portion of the physical block of memory to store a second portion of the second map tile, wherein a third portion of the physical block of memory stores a fourth portion of the first map tile, and wherein the physical block of memory stores the second portion of the second map tile and the fourth portion of the first map tile in a rolling array that is accessible using wrap-around read operations; and update the version number of the virtual map tile to a second value different from the first value, wherein the version number can be used to detect when a query on the virtual map tile occurred during updating of the virtual map tile.

9. The system of claim 8, wherein the rolling array comprises a two-dimensional (2D) array pertaining to the geographical area around the autonomous vehicle, and wherein the 2D array relates to map values represented by map coordinates.

10. The system of claim 8, wherein the instructions cause the processor to also:

identify additional tiles that represent the geographical area in the direction of the movement of the autonomous vehicle;

determine that data of at least one of the additional tiles matches the geographical area of another map tile currently stored in the physical block of memory; and bypass storing the data of the at least one of the additional tiles.

11. The system of claim 10, wherein the instructions also cause the processor to:

automatically perform the storing of the data of the at least one of the additional tiles when the geographical area is outside of a specific distance of the geographical area of the first map tile.

12. The system of claim 8, wherein the instructions also cause the processor to:

identify a third map tile after the autonomous vehicle has reached a margin distance from an edge of the first map tile, wherein the third map tile represents a further geographic area in a further direction of the movement of the autonomous vehicle.

13. The system of claim 8, wherein the instructions also cause the processor to:

identify a future geographical area of the autonomous vehicle; identify additional tiles within the geographical area of the second map tile that are outside of a specific distance of the future geographical area; and remove the additional tiles from the physical block of memory.

14. The system of claim 8, wherein the instructions also cause the processor to:

identify additional map tiles of the stored map that represent a geographical area, not in the direction of the movement of the autonomous vehicle; and remove the additional map tiles from the physical block of memory.

15. A non-transitory computer-readable storage medium storing instructions that, when executed by a processor, cause the processor to:

store data representing a virtual map tile in a physical block of memory of an autonomous vehicle computing system, wherein the virtual map tile pertains to a geographical area around an autonomous vehicle that is represented by portions of at least a first map tile of a stored map, and wherein the virtual map tile has a version number having a first value; and as the autonomous vehicle moves:

identify a second map tile of the stored map that represents the geographical area in a direction of movement of the autonomous vehicle;

update the virtual map tile by reusing a first portion of the physical block of memory to store a second portion of the second map tile, wherein a third portion of the physical block of memory stores a fourth portion of the first map tile, and wherein the physical block of memory stores the second portion of the second map tile and the fourth portion of the first map tile in a rolling array that is accessible using wrap-around read operations; and update the version number of the virtual map tile to a second value different from the first value, wherein the version number can be used to detect when a query on the virtual map tile occurred during updating of the virtual map tile.

16. The computer-readable storage medium of claim 15, wherein the rolling array comprises a two-dimensional (2D) array pertaining to the geographical area around the autonomous vehicle, and wherein the 2D array relates to map values represented by map coordinates.

17. The computer-readable storage medium of claim 15, wherein the instructions also cause the processor to:

identify additional tiles that represent the geographical area in the direction of the movement of the autonomous vehicle;

determine that data of at least one of the additional tiles matches the geographical area of another map tile currently stored in the physical block of memory; and bypass storing the data of the at least one of the additional tiles.

18. The computer-readable storage medium of claim 17, wherein the instructions also cause the processor to:

automatically perform the storing of the data of the at least one of the additional tiles when the geographical area is outside of a specific distance of the geographical area of the first map tile.

19. The computer-readable storage medium of claim 15, wherein the instructions also cause the processor to:

identify a future geographical area of the autonomous vehicle; identify additional tiles within the geographical area of the second map tile that are outside of a specific distance of the future geographical area; and remove the additional tiles from the physical block of memory.

20. The computer-readable storage medium of claim 15, wherein the instructions also cause the processor to:

identify additional map tiles of the stored map that represent a geographical area, not in the direction of the movement of the autonomous vehicle; and remove the additional map tiles from the physical block of memory.

\* \* \* \* \*